(12) United States Patent
Van Hal et al.

(10) Patent No.: US 10,823,039 B2
(45) Date of Patent: Nov. 3, 2020

(54) COOLING SYSTEM

(71) Applicant: Deere and Company, Moline, IL (US)

(72) Inventors: Todd E. Van Hal, Eldridge, IA (US);
Lavern L. Weinschenk, Bettendorf, IA (US); Drew D. Brennan, Bettendorf, IA (US); Cory R. Conner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 130 days.

(21) Appl. No.: 16/024,776

(22) Filed: Jun. 30, 2018

(65) Prior Publication Data
US 2020/0003108 A1    Jan. 2, 2020

(51) Int. Cl.
| F01P 3/18 | (2006.01) |
| B60K 11/04 | (2006.01) |
| B60K 11/06 | (2006.01) |
| B60K 11/08 | (2006.01) |

(52) U.S. Cl.
CPC ............... *F01P 3/18* (2013.01); *B60K 11/06* (2013.01); *B60K 11/085* (2013.01); *F01P 2070/50* (2013.01)

(58) Field of Classification Search
CPC ...... F01P 2060/02; B60K 11/00; B60K 11/04; E02F 9/0858; F02B 29/0418; F02B 29/0456; F02B 29/0493; F28D 1/0452; F28D 2021/0082
See application file for complete search history.

(56) References Cited

U.S. PATENT DOCUMENTS

| 3,720,259 | A | * | 3/1973 | Fritz | F28D 7/08 165/162 |
| 3,846,619 | A | * | 11/1974 | Wightman | H05B 3/32 219/532 |
| 3,978,919 | A | | 9/1976 | Fachbach et al. | |
| 4,584,756 | A | * | 4/1986 | Arnoldt | F16L 23/14 285/363 |
| 4,742,691 | A | * | 5/1988 | Kennedy | F24F 1/0323 62/272 |
| 4,848,450 | A | * | 7/1989 | Lapkowsky | F28D 9/0037 165/166 |
| 7,004,502 | B2 | * | 2/2006 | Borroni-Bird | B62D 21/152 180/402 |
| 7,384,234 | B2 | | 6/2008 | Petersen | |
| 10,100,712 | B2 | * | 10/2018 | Baldus | F01P 11/10 |

(Continued)

FOREIGN PATENT DOCUMENTS

| CN | 104149854 A | 11/2014 |
| EP | 0098397 A1 | 1/1984 |

(Continued)

OTHER PUBLICATIONS

European Search Report issued in counterpart European Patent Application No. 19182137.0 dated Nov. 20, 2019 (7 pages).

*Primary Examiner* — Bryan A Evans
(74) *Attorney, Agent, or Firm* — Rathe Lindenbaum LLP (57) ABSTRACT

A cooling system may include a skeleton frame having a central opening to receive and frame at least one cooling core. The skeleton frame has an interior to contain at least one conduit through which at least one fluid to be cooled may flow to the at least one cooling core. The cooling system may further include a skin wrapping over and about the skeleton frame to seal the interior of the skeleton frame.

20 Claims, 8 Drawing Sheets

(56) References Cited

U.S. PATENT DOCUMENTS

| | | | |
|---|---|---|---|
| 10,294,850 B2* | 5/2019 | Shue | B60K 11/04 |
| 2010/0281784 A1* | 11/2010 | Leo | E04B 1/0023 52/16 |
| 2011/0155081 A1 | 6/2011 | Entriken et al. | |
| 2014/0102675 A1 | 4/2014 | Ingold | |
| 2016/0341443 A1* | 11/2016 | Ramos | F24F 13/0263 |
| 2018/0117852 A1* | 5/2018 | Huotari | B29C 66/73921 |

FOREIGN PATENT DOCUMENTS

| | | | |
|---|---|---|---|
| FR | 2992683 | A1 | 1/2014 |
| WO | 2006069840 | A1 | 7/2006 |
| WO | 2016092056 | A1 | 6/2016 |

\* cited by examiner

COOLING SYSTEM

BACKGROUND

Working machines frequently operate in an environment having airborne particles and debris. Such working machines include a power unit in the form of an internal combustion engine or an electric motor that drives working components or members of the machine. Such working machines frequently include heat exchangers or cooling cores that cool various fluids used by the machine, such as radiator fluid, oil, fuel, air-conditioning fluid and/or charge air cooler (CAC) fluid.

BRIEF DESCRIPTION OF THE DRAWINGS

FIG. 10 comprises an enlarged blowup of a portion of one of the cooling cores.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example cooling systems, working machines and methods that support and house at least one cooling core as part of a cooling module in a manner that may reduce the weight, material cost, fabrication and assembly cost and complexity of the cooling module. The example cooling systems, working vehicles and methods support the cooling core with a composite package or housing having a skeleton frame formed from a heavier stronger material for physically supporting the cooling core in combination with a generally lighter, more easily formable outer skin covering and sealing interior portions of the skeleton frame.

Because the cooling core is supported by a skeleton frame which may be open framed, the weight of the cooling system may be reduced. Because the skin is not heavily relied upon to support the mass of the cooling core, the skin may be thinner and lighter in weight, further reducing the weight of the cooling system. Because the skin may be lighter and thinner, the skin may be more easily fabricated and shaped to form complex geometries, enhancing compactness of the cooling system. Because the skin may comprise a continuous layer wrapping about the skeleton frame without seams or breaks, the need for caulking or other additional sealing gaskets or other to structures inhibit ingress of airborne debris is reduced or eliminated. As a result, the overall weight and cost of the cooling system may be reduced and manufacturing may be simplified.

Disclosed herein is an example cooling system that may include a skeleton frame having a central opening to receive and frame at least one cooling core. The skeleton frame has an interior to contain at least one conduit through which at least one fluid to be cooled may flow to the at least one cooling core. The cooling system may further include a skin wrapping over and about the skeleton frame to seal the interior of the skeleton frame.

Disclosed herein is an example working vehicle for an air-born debris environment. The working vehicle may comprise a chassis, ground motive members coupled to the chassis, a power unit supported by the chassis and a cooling system supported by the chassis. The cooling system may comprise at least one cooling core, a skeleton frame having a central opening receiving and framing the at least one cooling core, at least one fluid conduit extending within an interior of the skeleton frame and connected to the at least one cooling core and a skin wrapping over and about the skeleton frame to seal the interior of the skeleton frame.

Disclosed herein is an example fluid cooling method. The example fluid cooling method may comprise supporting a cooling core within a rigid open frame skeleton, sealing an interior of the open frame skeleton with a skin, moving fluid within the interior of the open frame skeleton and through fluid passages of the cooling core and drawing ambient air across the cooling core to remove heat from the fluid within the cooling core.

Figure 1A:
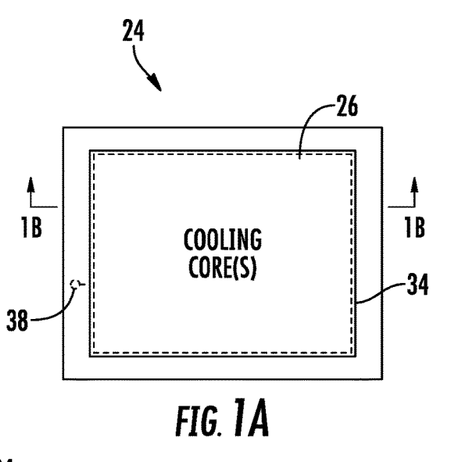
FIG. 1A is a front view of an example cooling core support package supporting at least one example schematically shown cooling core shown in broken lines.
Figure 1B:
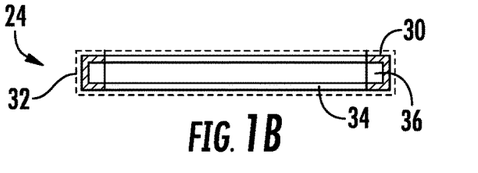
FIG. 1B is a sectional view of the package of FIG. 1A taken along line 1B-1B.

FIGS. 1A and 1B illustrate an example cooling core support package 24 which may be utilized to support and frame at least one cooling core 26 (schematically illustrated in broken lines in FIG. 1A). FIG. 1B is a sectional view of package 24 without cooling core 26. Cooling core support package 24, when supporting and containing the at least one cooling core 26 forms a cooling module which may be utilized as part of a cooling system to cool a working machine. In particular, the cooling module formed by cooling core package 24 and the at least one cooling core 26 function as a heat exchanger, cooling at least one fluid (a gas or a liquid) passing through the at least one cooling core 26. Each cooling core of the at least one cooling core 26 comprises may have fluid channels through which the fluid to be cooled travels or flows and thermally conductive ribs or fins interconnecting and extending between the fluid channels. Airflow through and across the fins and fluid channels extracts heat from the fluid within the channels to cool the fluid within the channels.

Cooling core support package 24 comprises skeleton frame 30 and outer housing or skin 32. Skeleton frame 30 (shown in FIG. 1B) comprises a structure extending within skin 32 configured to physically or structurally support and retain the at least one cooling core 26. In some implementations, the at least one cooling core may be quite large and heavy, wherein skeleton frame has sufficient strength and stiffness to support the size and weight of the at least one cooling core 26. In one implementation, the at least one cooling core has a front surface area of at least 0.5 square meters and a mass or weight of at least 30 Kg supported by the skeleton frame. In one such implementation, skeleton frame 30 is formed from a sheet metal having a wall or panel thickness of at least 2 mm. In one such implementation, skeleton frame 30 is formed from a stamped and pressed or bent steel panel having a thickness of at least 2 mm.

As shown by FIG. 1B, skeleton frame 30 forms a central opening 34 to receive the at least one cooling core 26. Skeleton frame 30 forms and inwardly facing U-shaped channel that completely extends about the at least one cooling core 26 and that creates an interior 36 in which at least one conduit 38 (shown in FIG. 1A) may extend. Conduit 38 supplies fluid to and/or carry fluid away from the at least one cooling core 26. Air drawn through cooling core 26 extracts and absorbs heat from the fluid flowing within and across cooling core 26, cooling the fluid.

In some implementations, skeleton frame 30 may be an open frame, having multiple openings, notches, cutouts and like to reduce the weight of skeleton frame 30. In some implementations, the U cross-sectional shaped channel skeleton frame 30 may extend only partially about central opening 34 or may extend at spaced intervals about central opening 34. In some implementations, skeleton frame 30 may have a basin-shaped profile rather than a U-shaped channel, the basin-shaped profile having a backwards L cross sectional shape.

Skin 32 comprises a continuous uninterrupted panel or layer of material at least partially wrapping up over and about skeleton frame 30 to cover and seal any openings, gaps or seams within skeleton frame 30. Skin 32 provides minimal, if any, structural support of the at least one cooling core 26. In some implementations, skin 32 may be formed from a material similar to that of skeleton frame 30, but with a much smaller thickness. For example, in one implementation, skeleton frame 30 may be formed from a steel panel having a thickness of greater than 2 mm, whereas skin 32 may be formed from a steel sheet or panel having a thickness of no greater than 2 mm and nominally no greater than 1 mm. In some implementations, skin 32 may be formed from a less rigid or less strong material than that of skeleton frame 30. For example, in one implementation, skin 32 may be formed from a thin sheet of aluminum having a thickness no greater than 2 mm and nominally no greater than 1 mm.

In one implementation, skin 32 may be formed from a composite material, panel or sheet formed from multiple materials. For example, in one implementation, skin 32 may be formed from a resin or polymer in which other polymers or particles are embedded. For example, in one implementation, skin 32 may be formed from a fiberglass resin material. In some implementations, skin 32 may be formed from at least one polymer or an imperforate film or sheet of fabric or the like.

In one implementation, skin 32 may be molded into a particular shape. In one implementation, skin 32 may be molded over and about skeleton frame 30. In other implementations, skin 32 may be molded into a particular shape, wherein skeleton frame 30 is inserted into or mounted to skin 32 after skin 32 has been shaped and formed.

Skin 32 may be provided with a complex shape or geometry without gaps, seems or breaks. As a result, skin 32 provides a continuous layer having fewer gaps or breaks that need to be caulked or otherwise occluded to prevent or inhibit the ingress of airborne contaminants. In one implementation, skin 32 has a U-shape cross-section or an L-shaped cross-section. In some implementations, skin 32 may be rounded or curved, having rounded corners and rounded edges. In one implementation, skin 32 covers the entire outer perimeter or outer surface of skeleton frame 30. In some implementations, skin 32 may completely envelop skeleton frame 30.

Figure 2A:
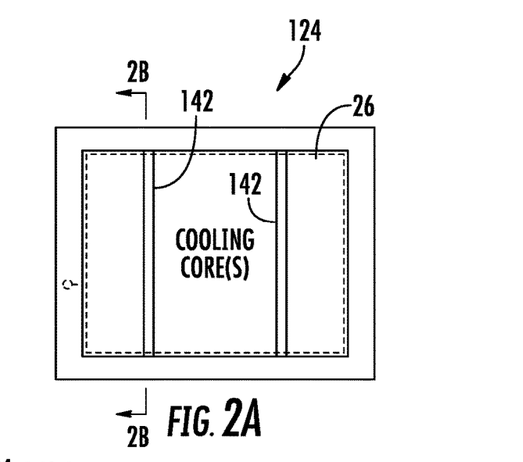
FIG. 2A is a front view of an example cooling core support package supporting at least one example schematically shown cooling core shown in broken lines.
Figure 2B:
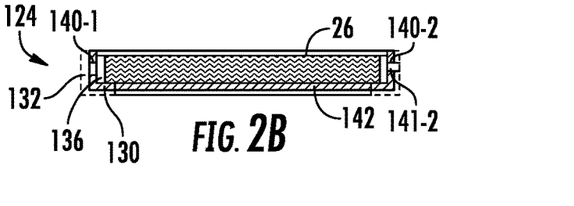
FIG. 2B is a sectional view of the package of FIG. 1A taken along line 2B-2B.

FIGS. 2A and 2B illustrate an example cooling core support package 124 which may be utilized to support and frame at least one cooling core 26 (schematically illustrated in broken lines in FIG. 2A). Cooling core support package 124, when supporting and containing the at least one cooling core 26 forms a cooling module which may be utilized as part of a cooling system to cool a working machine. In particular, the cooling module formed by cooling core package 124 and the at least one cooling core 26 function as a heat exchanger, cooling at least one fluid (a gas or a liquid) passing through the at least one cooling core 26. Cooling core support package 124 comprises skeleton frame 130 and outer housing or skin 132.

Skeleton frame 130 (shown in FIG. 2B) comprises a structure extending within skin 132 configured to physically or structurally support and retain the at least one cooling core 26. In some implementations, the at least one cooling core may be quite large and heavy, wherein skeleton frame has sufficient strength and stiffness to support the size and weight of the at least one cooling core 26. In one implementation, the at least one cooling core has a front surface area of at least 0.5 square meters and a mass or weight of at least 30 Kg supported by the skeleton frame. In one such implementation, skeleton frame 130 is formed from a sheet metal having a wall or panel thickness of at least 2 mm. In one such implementation, skeleton frame 130 is formed from a stamped and pressed or bent steel panel having a thickness of at least 2 mm.

As shown by FIG. 2B, skeleton frame 130 forms a central opening 134 to receive the at least one cooling core 26. Skeleton frame 130 is L-shaped, forming a basin about central opening 34 that completely extends about the at least one cooling core 26 and that creates an interior 136 at the inner corners of the basin in which at least one conduit 38 (shown in FIG. 1A) may extend. Conduit 38 supplies fluid to and/or carry fluid away from the at least one cooling core 26. Air drawn through cooling core 26 extracts and absorbs heat from the fluid flowing within and across cooling core 26, cooling the fluid.

In the example illustrated, skeleton frame 130 is open framed, having multiple voids 140-1, 140-2 (collectively referred to as voids 140), in the form of completely surrounded openings notches, cutouts and like to reduce the weight of skeleton frame 130. As shown by FIG. 2B, in such implementations, skin 132 extends over, spans or covers voids 140. In some implementations, skin 132 may project into or at least partially fill the underlying voids 140. For example, as shown by the right side of 2B, skin 132 may include a projection 141-2 that projects into an at least partially fills the void 140-2. In such an implementation, the filling of void 140-2 by overlying portions of the skin 132 may assist in locating, locking or retaining skin 132 in place relative to frame 130.

As further shown by FIGS. 2A and 2B, skeleton frame 130 additionally comprises a pair of support rails 142. Support rails 142 extend from a first side of frame 130 to a second side of frame 130, opposite to the first side. Like the rest of skeleton 130, rails 142 are formed from material and has sufficient strength to assist in structurally supporting and retaining or physically supporting the mass or weight of the at least one cooling core 26. In one implementation, rails 142 form a floor against and upon which the at least one cooling core 26 may rest and bear against when secured within central opening 34.

Although package 124 is illustrated as comprising a pair of spaced rails 142, in other implementations, package 124 may comprise a single rail or greater than two spaced rails. In other implementations, package 124 may comprise at least two non-parallel, crisscrossing rails. In yet other implementations, rails 142 may be omitted.

In one implementation, rails 142 are configured to be mounted to the at least one cooling core 26. For purposes of this disclosure, the phrase "configured to" denotes an actual state of configuration that fundamentally ties the stated function/use to the physical characteristics of the feature proceeding the phrase "configured to". In one implementation, the least one cooling core 26 may be fastened to rails 142 by fasteners that pass through rails 142.

In some implementations, cross-sectional shape of skeleton frame 130 may vary as it extends about central opening 34. In some implementations, package 124 may alternatively comprise a U-shaped channel, similar to shown with respect to skeleton frame 30, along at least portions of frame 130.

Skin 132 is similar to skin 32 described above except that skin 132 has a different overall shape due to the different underlying shape of skeleton frame 130. Skin 132 comprises a continuous uninterrupted panel or layer of material at least partially wrapping up over and about skeleton frame 130 to cover and seal any openings, gaps or seams within skeleton frame 130. Skin 132 provides minimal, if any, structural support of the at least one cooling core 26. In some implementations, skin 132 may be formed from a material similar to that of skeleton frame 130, but with a much smaller thickness. For example, in one implementation, skeleton frame 130 may be formed from a steel panel having thickness of greater than 2 mm, whereas skin 132 may be formed from a steel sheet or panel having a thickness of no greater than 2 mm and nominally no greater than 1 mm. In some implementations, skin 132 may be formed from a less rigid or less strong material than that of skeleton frame 130. For example, in one implementation, skin 132 may be formed from a thin sheet of aluminum having a thickness no greater than 2 mm and nominally no greater than 1 mm.

In one implementation, skin 132 may be formed from a composite material, panel or sheet formed from multiple materials. For example, in one implementation, skin 132 may be formed from a resin or polymer in which other polymers or particles are embedded. For example, in one implementation, skin 132 may be formed from a fiberglass resin material. In some implementations, skin 132 may be formed from at least one polymer or an imperforate film or sheet of fabric or the like.

In one implementation, skin 132 may be molded into a particular shape. In one implementation, skin 132 may be molded over and about skeleton frame 30. In other implementations, skin 132 may be molded into a particular shape, wherein skeleton frame 130 is inserted into or mounted to skin 132 after skin 132 has been shaped and formed.

Skin 132 may be provided with a complex shape or geometry without gaps, seems or breaks. As a result, skin 132 provides a continuous layer having fewer gaps or breaks that need to be caulked or otherwise occluded to prevent or inhibit the ingress of airborne contaminants. In the example illustrated, skin 132 has an L-shaped cross-section. In some implementations, skin 132 may be rounded or curved, having rounded corners and rounded edges. For example, in one implementation, the exterior of skin 132 may have a rounded edge or corner. In one implementation, skin 132 covers the entire outer perimeter or outer surface of skeleton frame 130. In some implementations, skin 132 may completely envelop skeleton frame 130.

Figure 3:
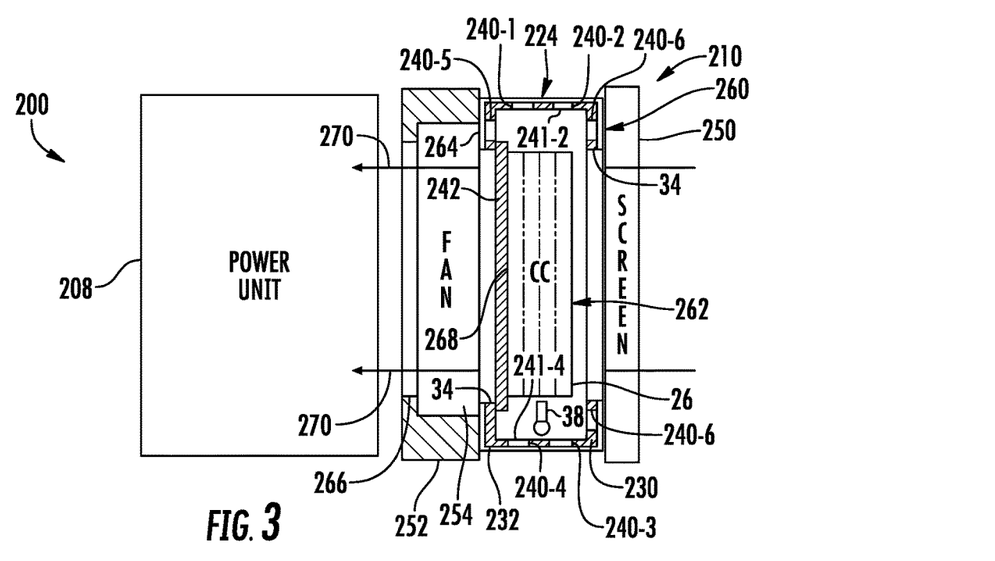
FIG. 3 is a sectional view illustrating portions of an example working machine including an example cooling system.

FIG. 3 is a sectional view (with portions schematically shown) of an example working machine 200. Working machine 200 works in an airborne debris environment. In one implementation, work machine 200 is stationary, working in a high debris environment in a confined space. In another implementation, work machine 200 may be towed. Still other implementations, work machine 200 may be part of a self-propelled vehicle. Examples of working machine 200 include, but are not limited to, combine harvesters, tractors, sprayers, forestry equipment, agricultural equipment, wood chippers, generators, cotton harvesters, road construction equipment, excavation equipment or any other machine that may create airborne debris or trash. Working machine 200 comprises power unit 208 and cooling system 210.

Power unit 208 (schematically shown) generates power, force, to drive and move one or more mechanisms or components of work machine 200. Power unit 208 converts energy into motion or force, such as torque. In one implementation, power unit 208 comprises an internal combustion engine. In another implementation, power unit 208 comprises an electric motor driven from a battery. During its operation, power unit 208 may generate heat. In addition, other components of working machine 200 may also generate heat. Such heat may be detrimental to the performance of power unit 208 or other components of working machine 200.

Cooling system 210 cools power unit 208 and/or other components of working machine 200 by circulating fluid that has been used by or that has passed adjacent to or along such components through a heat exchanger provided as part of a cooling core. Ambient air, at a temperature lower than that of the fluid entering the cooling core, is drawn through the cooling core, wherein heat of the fluid is extracted and removed, allowing the now cooler fluid to return to the component being cooled. In the example illustrated, cooling system 210 may additionally direct air adjacent to or across components to be cooled, such as adjacent to or across power unit 208. Cooling system 210 comprises cooling core support package 224, at least one cooling core 26, screen 250, fan shroud 252 and fan 254.

Cooling core support package 224 is similar to cooling core support package 24 described above except that package 224 comprises skeleton frame 230 and skin 232. Skeleton frame 230 is similar to skeleton frame 30 described above except that skeleton frame 230 additionally comprises voids 240-1, 240-2, 240-3, 240-4, 240-5 and 240-6 (collectively referred to as voids 240) and support rails 242 (one of which is shown). Those remaining components of package 224 which correspond to components of package 24 are numbered similarly.

Voids 240 comprise openings extending through the wall or walls of skeleton frame 230. In the example illustrated, voids 240 comprise completely encircled or surrounded openings or bores through the wall forming skeleton frame 230. In other implementations, at least some of voids 240 may comprise side notches are cutouts. Voids 240 are located so as to not reduce or minimize structural strength of skeleton frame 230 as skeleton frame 230, like skeleton frame 30, provides the structural physical support and retention of the at least one cooling core 26. Voids 240 reduce the weight of package 224 and system 210.

Support rails 242 are similar to support rails 142 described above. Support rails 242 assist in supporting central regions of the at least one cooling core 26. In one implementation, support rails 242 to further provide a mounting surface for mounting the at least one cooling core 26 within skeleton frame 230 or skin 232. In one implementation, support rails 242 are integrally formed as a single unitary body with skeleton frame 230. In another implementation, support rails 242 are bonded, welded or fastened to the remainder of skeleton frame 230. In one implementation, support rails 242 are further fastened to the at least one cooling core 26. In some implementations, such as where the at least one cooling core 26 is mounted to other portions of skeleton frame 230, support rails 242 may be omitted.

Skin 232 is similar to skin 32 described above except that skin 232 further comprises projections 241-2 and 241-4. Projections 241-2 and 241-4 are located so as to project into and be received within voids 240-2 and 240-4, respectively. Projections 241-2 and 241-4 assist in locating and retaining skin 232 relative to skeleton frame 230. In one implementation, where skin 232 is molded about skeleton frame 230, projections 241-2 and 241-4 may be molded into voids 240-2 and 240-4, respectively. In other implementations where skin 232 is positioned about skeleton frame 230, projections 241-2 and 241-4 may be snapped otherwise located in two voids 240-2 and 240-4, respectively. In yet other implementations where skeleton frame 230 is mounted are positioned within skin 232, voids 240-2 and 240-2 may be located in a line so as to receive projections 241-2 and 241-4, respectively. In yet other implementations, projections 241-2, 241-4 may be omitted. In some implementations, voids 240 may be omitted.

Screen 250 (schematically shown) extends across a front face 260 of package 224, spanning over central opening 34 of skeleton frame 230. Screen 250 inhibits the entry of airborne debris through opening 34 and onto the front face 262 of the at least one cooling core 26. In the example illustrated, screen 250 is mounted to package 224.

Fan enclosure or shroud 252 extends across a rear face 264 of package 224. In one implementation, fan shroud 252 is mounted to package 224. Fan shroud 252 has an opening 266 insubstantial line with central opening 34 of skeleton frame 230 and of package 224. Fan shroud 252 partially surrounds fan 254 opposite to central opening 34 and opposite to a rear face 268 of the at least one cooling core 26.

Fan 254 (schematically shown) comprise a blower supported by fan shroud 252. As indicated by arrows 270, fan 254 draws air through screen 250, through the at least one cooling core 26 and at power unit 208. As discussed above, the ambient air drawn by fan 254, such as from locations external to working machine 200, is at a temperature lower than that of the fluid entering the cooling core. The cooler air drawn through the at least one cooling core 26 absorbs or extracts heat from the fluid flowing through conduits or tubing of the at least one cooling core 26, allowing the now cooler fluid to return to the component being cooled.

The differences in air pressure created by fan 254 within cooling system 210 may tend to draw airborne debris or particles into package 224, wherein the debris or particles may deposit upon the front face 262 of the at least one cooling core 26, blocking our impeding the flow of air through the at least one cooling core 26 and reducing the performance of cooling system 210. In addition to facilitating the use of an open frame to skeleton frame 230 to reduce the weight of package 224 and cooling system 210 and in addition to reducing manufacturing and assembly complexity and cost, skin 232 provides an enhanced seal for the interior of package 224, reducing the entry of airborne debris. As a result, skin 232 may enhance the performance of cooling system 210.

Although working machine 200 is illustrated as comprising cooling core support package 224, in other implementations, working machine 200 may comprise other similar cooling core support packages. For example, in other implementations, working machine 200 may comprise cooling core support package 24 or 124 described above. It should be appreciated that work machine 200 may likewise comprise any of the following described cooling core support packages or similar cooling core support packages.

Figure 4:
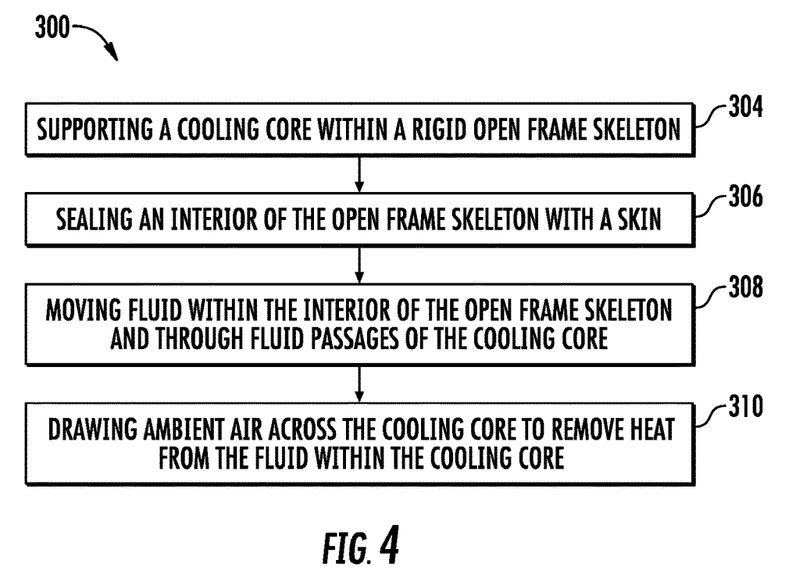
FIG. 4 is a flow diagram of an example fluid cooling method for a work machine.

FIG. 4 is a flow diagram of an example fluid cooling method 300 that may be carried out with a working machine that operates in an environment having airborne debris or particles. Method 300 facilitates the extraction of heat from various fluids to cool the working machine with a cooling system that may be lighter in weight and lower in manufacturing and assembly costs. Method 300 facilitates the enhanced extraction of heat from various fluids in an airborne debris environment by lessening the accumulation of debris across at least one cooling core. Although method 300 is described in the context of being carried out by working machine 200 with cooling system 210, it should be appreciated that method 300 may likewise be carried out with other working machines and with other similar cooling systems.

As indicated by block 304, a cooling core is supported within a rigid open frame skeleton. In the example shown in FIG. 3, the least one cooling core 26 is supported within the rigid open frame skeleton 230.

As indicated by block 306, the interior of the open frame skeleton 230 is sealed with an external skin on skeleton frame 230. In the example shown in FIG. 3, the open frame skeleton 230 is sealed with skin 232. As described above, skin 232 is similar to skin 32. As such, skin 232 may be a nonmetal. Skin 232 may be a composite material, such as a fiberglass resin, or a polymer. Skin 232 may be a lightweight metal film or sheet having a reduced thickness or weight.

As indicated by block 308, fluid is moved within the interior of the open frame skeleton and through fluid passages of the cooling core. In the example shown in FIG. 3, fluid at a temperature greater than the ambient air, is drawn through a conduit 38 and passed through fluid passages across the at least one cooling core 26. Examples of the fluid passing through the fluid passages a cooling core include, but are not limited to, at least one of radiator fluid, oil, fuel, air-conditioning fluid and/or charge air cooler (CAC) fluid.

As indicated by block 310, ambient air is moved across (drawn or pushed) the cooling core to remove/extract heat from the fluid within the cooling core. In the example shown in FIG. 3, fan 254 draws ambient air through the at least one cooling core 26, through the front face 262 and out the rear face 268 and further through opening 266. The ambient air, being at a temperature less than that of the fluid flowing within the fluid passages of the at least one cooling core 26, absorbs or extracts heat from the fluid to cool the fluid. At the same time, the skin reduces the entry of airborne debris and particles that might otherwise partially occlude the flow of air through the cooling core to reduce its performance.

Figure 5:
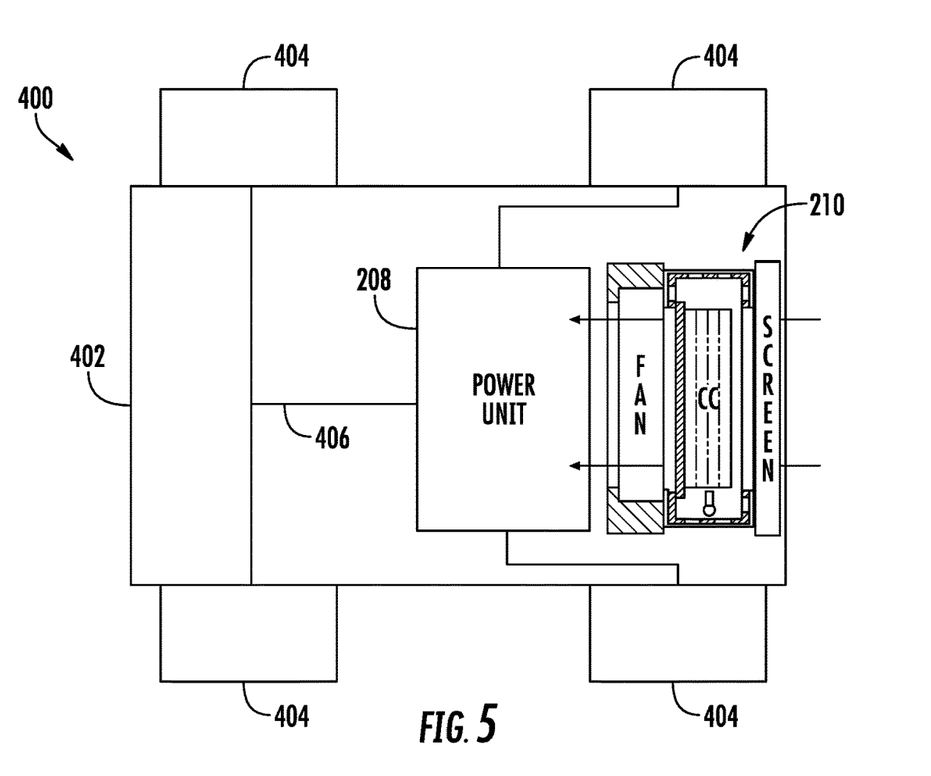
FIG. 5 is a top view schematically illustrating portions of an example working vehicle including an example cooling system.

FIG. 5 is a schematic diagram of an example working machine in the form of a working vehicle 400. Working vehicle 400 comprises a self-propelled vehicle to carry out processes in an airborne debris environment or processes that create airborne debris or trash. Examples of working vehicle 400 include, but are not limited to, combine harvesters, cotton harvesters, tractors, dump trucks, mowers, construction vehicles, forage harvesters, sprayers, forestry vehicles and agricultural vehicles.

In addition to power unit 208 and cooling system 210, working vehicle 400 comprises chassis 402, motive members 404 and transmission 406. Chassis 402 comprises an underlying framework that supports the remaining components of working vehicle 400. Motive members 404 comprise members that are driven by force generated by power unit 208 and transmitted by transmission 406 to propel vehicle 400. Examples of motor members 404 comprise tires, propellers and tracks. In the example illustrated, cooling system 210 draws ambient air from a rear of vehicle 400. In other implementations, system 210 may draw ambient air, for passage through the cooling core 626, from a side, top, bottom or front of vehicle 400, depending upon where air-borne debris may be more prevalent.

Figure 6A:
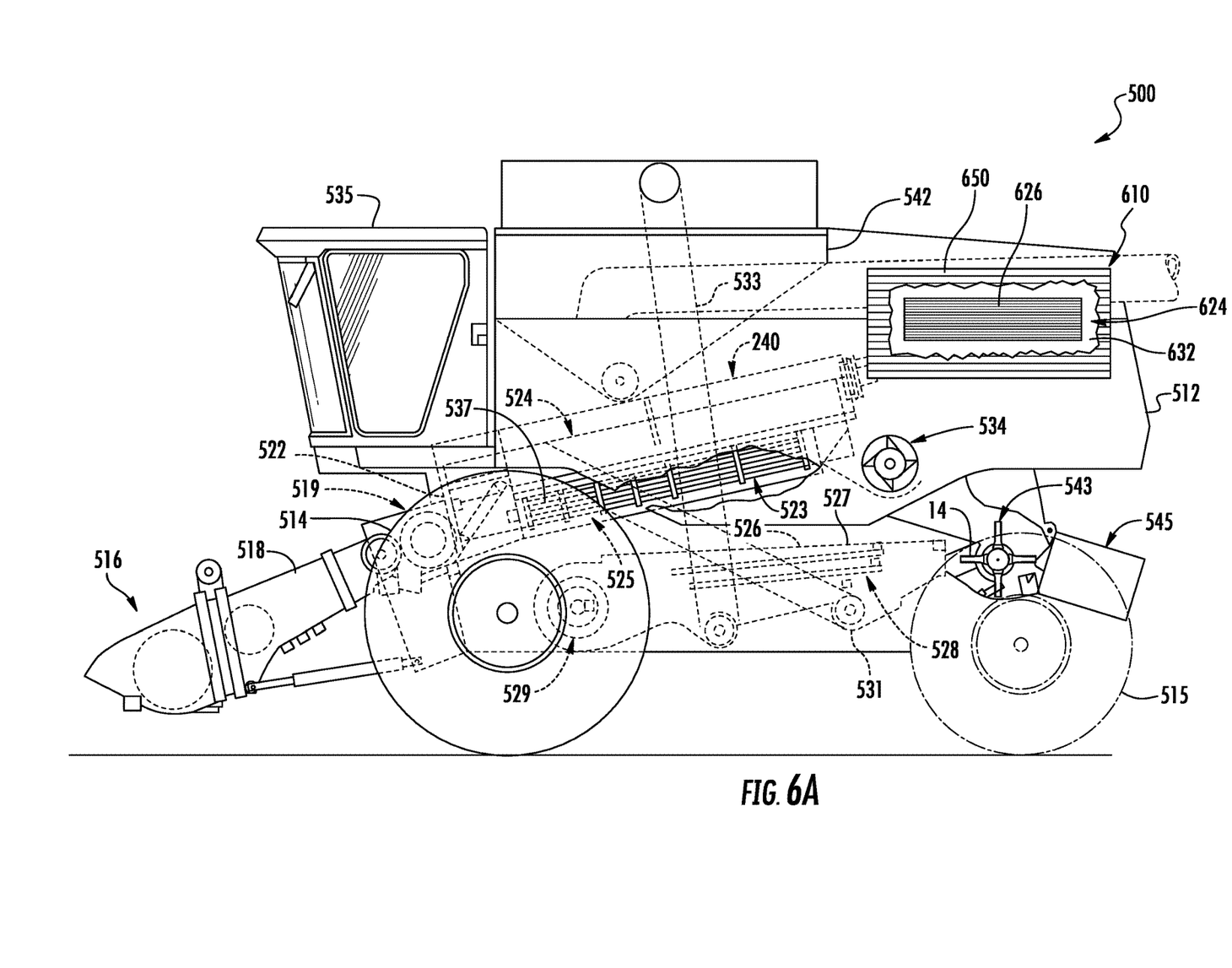
FIG. 6A is a side view of an example working vehicle, in the form of a combine harvester, including an example cooling system.
Figure 6B:
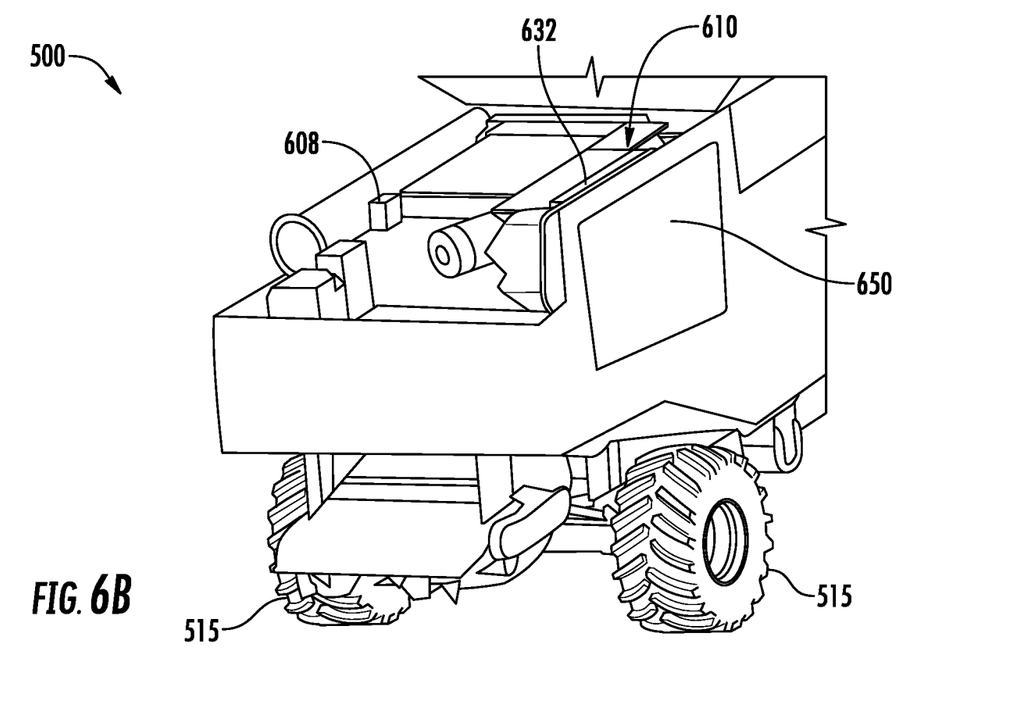
FIG. 6B is a rear perspective view of the combine harvester of FIG. 6A with portions removed for purposes of illustration.
Figure 6C:
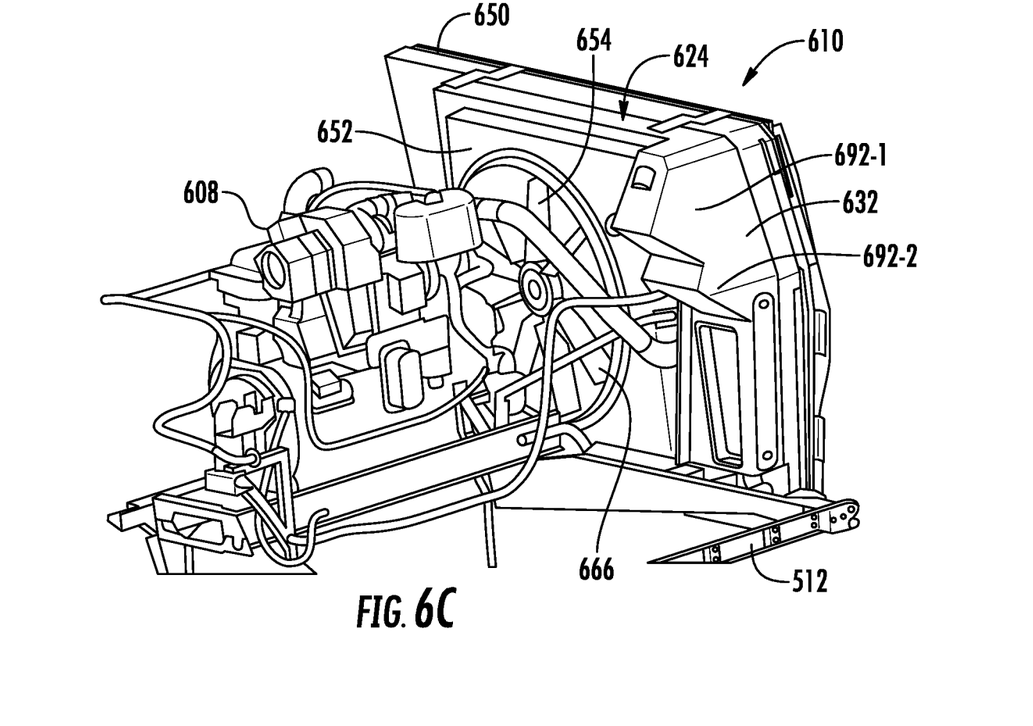
FIG. 6C is a rear perspective view of an example engine and the example cooling system of the harvester of FIG. 6A.

FIGS. 6A, 6B and 6C illustrate an example working vehicle in the form of an example combine harvester 500. Harvester 500 facilitates the harvesting of crops. In one implementation, combine harvester 500 may be equipped with a row unit head the harvesting row unit crops, such as corn. In other implementations, combine harvester 500 may be equipped with a head for harvesting other crops which are gathered by a reel and conveyed to a feeder house by augers or conveyor belts. Combine harvester 500 incorporates a power unit in the form of an internal combustion engine 608 (shown in FIG. 6B) and a cooling system 610 (shown schematically in FIG. 6A) to cool circulating fluids passing through system 610.

In addition to engine 608 and cooling system 610, combine harvester 500 comprises a main frame 512 having wheel structure including front and rear ground engaging wheels 514 and 515 supporting the main frame for forward movement over a field of crop to be harvested. The front wheels 514 are driven by an electronically controlled hydrostatic transmission.

A vertically adjustable header or harvesting platform 516 is used for harvesting a crop and directing it to a feeder house 518. The feeder house 518 is pivotally connected to the frame 512 and includes a conveyor for conveying the harvested crop to a beater 519. The beater 519 directs the crop upwardly through an inlet transition section 522 to a rotary cleaning and separating assembly 524. In other implementations, other orientations and types of cleaning structures and other types of headers 516, such as transverse frame supporting individual row units, are utilized.

The rotary cleaning and separating assembly 524 threshes and separates the harvested crop material. Grain and crop residue, such as chaff, fall through a concave 525 and separation grates 523 on the bottom of the assembly 524 to a cleaning system 526, and are cleaned by a chaffer 527, sieve 528 and air fan or blower 529. The blower 529 blows the lighter crop residue above the chaffer 527 and above the sieve 528 rearwardly to the crop residue spreader 545. The grain passes through openings, between louvers, provided by the chaffer 527 and the sieve 528. The clean grain is directed to elevator 533. Clean grain elevator 533 conveys the grain to tank 542. The clean grain in the tank 542 can be unloaded into a grain cart or truck by unloading auger. Tailings fall into the return elevator or auger 531 and are conveyed to the rotor 537 where they are threshed a second time.

Threshed and separated straw is discharged to a discharge beater 534. In one implementation, the discharge beater 534, in turn, propels the straw to the rotary chopper 543 for being discharged from the rear of combine harvester 500 by spreader 545. The operation of the combine is controlled from an operator's cab 535.

As shown by FIGS. 6A and 6B, engine 608 and cooling system 610 are located at a rear of harvester 500. In the example illustrated cooling system 610 draws ambient air from a transverse side of harvester 600 proximate the rear of harvester 500. In other implementations, system 610 may draw ambient air, for passage through at least one cooling core, from a side, top, bottom or front of harvester 500, avoiding locations where air-borne debris may be more prevalent.

As shown by FIG. 6C, cooling system 610 comprises cooling core support package 624, cooling cores 626-1, 626-2, 626-3, 626-4 and 626-5 (collectively referred to as cooling cores 626), fan shroud 652 and fan 654. FIGS. 7A, 7B, 8, 9A, 9B, 10 and 11 illustrate cooling core support package 624 or portions of package 624 in greater detail. Cooling core support package 624 comprises skeleton frame 630 and skin 632.

Figure 7A:
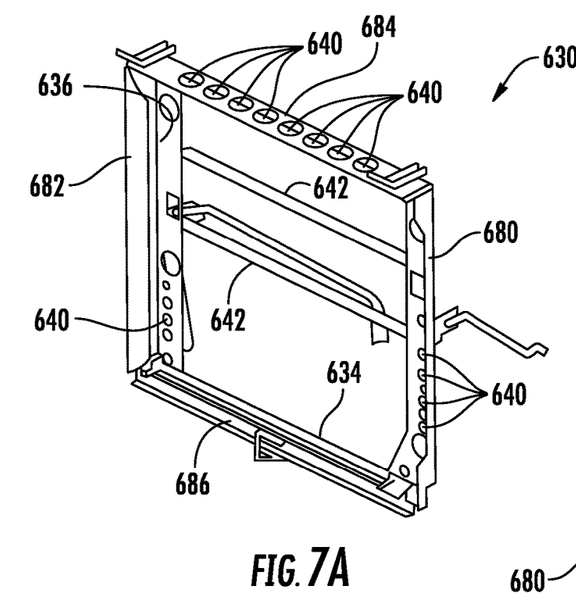
FIG. 7A is a front perspective view of an example skeleton frame of an example cooling core support package of the cooling system of the example harvester of FIG. 6A.
Figure 7B:
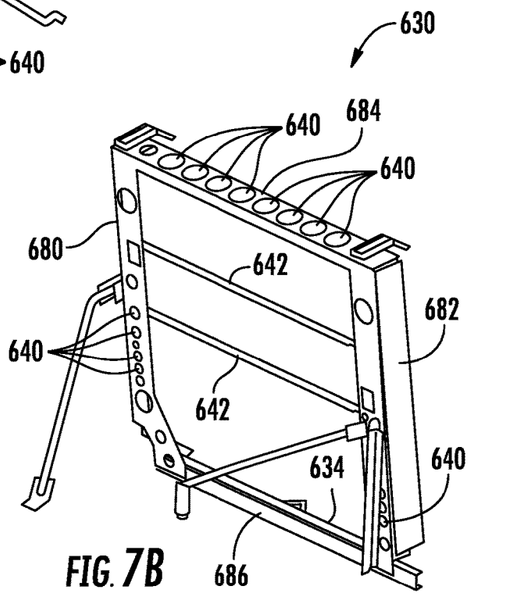
FIG. 7B is a rear perspective view of the example skeleton frame of FIG. 7A.

As shown by FIGS. 7A and 7B, skeleton frame 630 forms a central opening 634 to receive the cooling cores 626. Skeleton frame 630 is generally L-shaped, forming a basin about central opening 634 that completely extends about the at least one cooling core and that creates an interior 636 at the inner corners of the basin in which conduits (such as a conduit similar to conduit 38 shown in FIG. 1A) may extend. The conduits supply fluid to and/or carry fluid away from the cooling core 626. Air drawn through cooling core 626 extracts and absorbs heat from the fluid flowing within and across cooling cores 626, cooling the fluid.

Figure 9A:
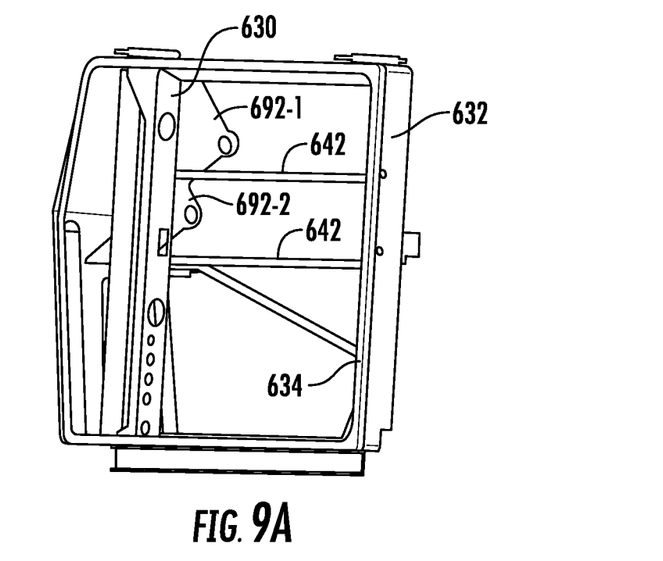
FIG. 9A is a front perspective view of the example skeleton frame of FIG. 7A joined to the example skin of FIG. 8.
Figure 9B:
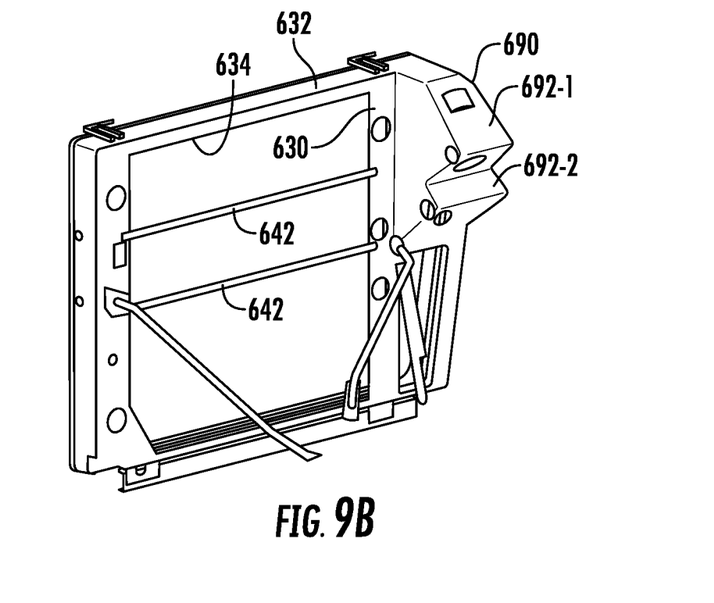
FIG. 9B is a rear perspective view of the example skeleton frame of FIG. 7A joined to the example skin of FIG. 8.

In the example illustrated, skeleton frame 630 is open framed, having multiple voids 640, in the form of completely surrounded openings notches, cutouts and like to reduce the weight of skeleton frame 630. As shown by FIGS. 9A and 9B, in such implementations, skin 632 extends over, spans or covers voids 640. In some implementations, skin 632 may project into or at least partially fill the underlying voids 640. For example, skin 632 may include a projection that projects into and at least partially fills the corresponding voids 640. In such an implementation, the filling of void 640 by overlying portions of the skin 632 may assist in locating, locking or retaining skin 632 in place relative to frame 630.

As further shown by FIGS. 7A and 7B, skeleton frame 630 additionally comprises a pair of support rails 642. Support rails 142 extend from a first side of frame 630 to a second side of frame 630, opposite to the first side. Like the rest of skeleton 630, rails 642 are formed from material and has sufficient strength to assist in structurally supporting and retaining or physically supporting the mass or weight of the cooling core 626. In one implementation, rails 642 form a floor against and upon which cooling core 626 may rest and bear against when secured within central opening 634.

Although package 624 is illustrated as comprising a pair of spaced rails 642, in other implementations, package 624 may comprise a single rail or greater than two spaced rails. In other implementations, package 624 may comprise at least two non-parallel, crisscrossing rails. In yet other implementations, rails 642 may be omitted.

In the example illustrated, rails 642 are mounted cooling core 626-1, 626-2 and 626-3. In one implementation, cooling core 626-1, 626-2 and 62-3 may be fastened to rails 642 by fasteners that pass through rails 642. In the example illustrated, skeleton frame has a cross-sectional shape of skeleton frame 630 that varies as it extends about central opening 634. As shown by FIGS. 7A and 7B, frame 630 comprises side segment 680, side segment 682, top segment 684 and bottom segment 686. Side segment 680 has a generally U-shaped cross-sectional shape facing in a forward direction, towards screen 650. Side segment 682 has a U-shaped cross-section facing toward central opening 634. Top segment 684 extends forwardly from side segment and has a shallow U-shaped cross-section facing towards central opening 634. Bottom segment 686 connects segments 680 and 682, being configured to mount to an underlying support structure. In some implementations, skeleton frame 630 may have other configurations similar to that described above with respect to skeleton frames 30, 130 and 230.

Skin 632 is similar to skin 32 and 132 described above FIG. 8 illustrates skin 632 independent of frame 630. FIGS. 9A and 9B illustrate skin 632 receiving and mounted to skeleton frame 630. Skin 632 comprises a continuous uninterrupted panel or layer of material at least partially wrapping up over and about skeleton frame 630 to cover and seal any openings, gaps or seams within skeleton frame 630. Skin 632 provides minimal, if any, structural support of the cooling core 626. In some implementations, skin 632 may be formed from a material similar to that of skeleton frame 630, but with a much smaller thickness. For example, in one implementation, skeleton frame 630 may be formed from a steel panel having thickness of greater than 2 mm, whereas skin 632 may be formed from a steel sheet or panel having a thickness of no greater than 2 mm and nominally no greater than 1 mm. In some implementations, skin 632 may be formed from a less rigid or less strong material than that of skeleton frame 630. For example, in one implementation, skin 632 may be formed from a thin sheet of aluminum having a thickness no greater than 2 mm and nominally no greater than 1 mm.

In one implementation, skin 632 may be formed from a composite material, panel or sheet formed from multiple materials. For example, in one implementation, skin 632 may be formed from a resin or polymer in which other polymers or particles are embedded. For example, in one implementation, skin 632 may be formed from a fiberglass resin material. In some implementations, skin 632 may be formed from at least one polymer or an imperforate film or sheet of fabric or the like.

Figure 8:
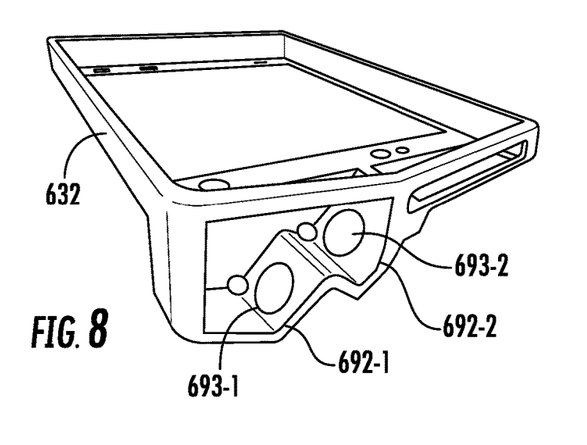
FIG. 8 is a front perspective view of an example skin of the example cooling core support package of the cooling system of the example harvester of FIG. 6A.

In the example illustrated, skin 632 is first formed as shown in FIG. 8 followed by subsequent mounting of the individual piece of skeleton frame 630 to one another and to skin 632. In other implementations, skin 632 may be molded over and about skeleton frame 630.

Skin 632 may be provided with a complex shape or geometry without gaps, seems or breaks. As a result, skin 632 provides a continuous layer having fewer gaps or brakes that need to be caulked or otherwise occluded to prevent or inhibit the ingress of airborne contaminants. In the example illustrated, skin 632 may be rounded or curved, having rounded corners and rounded edges. For example, in one implementation, the exterior of skin 632 may have a rounded edge or corner. Stamping or molding from a single continuous shaper part with varying radii lend itself to eliminate multiple pieces and gaps by process alone. Specific radii are dependent on the material and process used. In other implementations, skin 632 may completely envelop skeleton frame 630.

As further shown by FIGS. 8, 9A and 9B, skin 632 forms an outer wall 690 that projects outwardly beyond and away from central opening 634, along the perimeter of skeleton frame 630. Wall 690 forms skin ducts 692-1, 692-2 (collectively referred to as ducts 692) having duct opening 693-1, 693-2 (collectively referred to as duct openings 693), respectively. Skin ducts 692 guide and direct air flow towards ducts mounted within duct opening 693. Duct openings 693 receive and support ducts 695-1, 695-2 (collectively referred to as ducts 695) (shown in FIG. 12). Duct 695 deliver air to an intake of engine 608.

Figure 12:
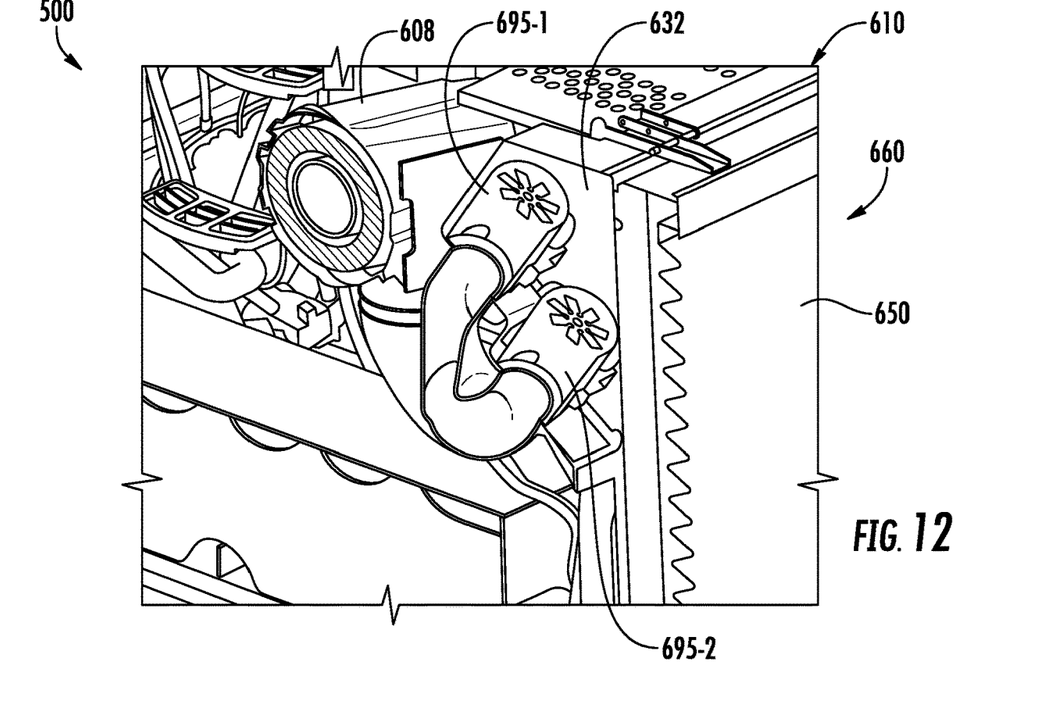
FIG. 12 is an enlarged fragmentary sectional view of a portion of the harvester of FIG. 6A.

As further shown by FIG. 12, duct opening 693 support ducts 695 at an upwardly inclined orientation or angle, away from the ground and away from wheels 514, 515. As a result, airborne debris is less likely to flow upward and into duct 695. Likewise, rain is also less likely to enter ducts 695. Because skin ducts 692 support ducts 695, duct 695 may be are easily assembled as part of cooling system 610.

Figure 10:
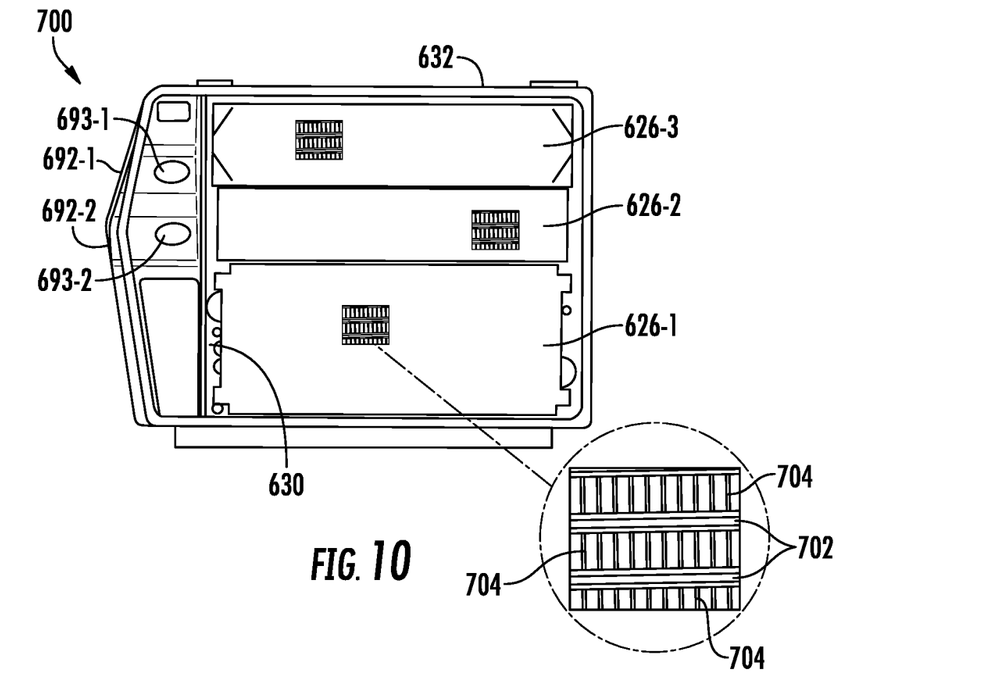
FIG. 10 is a front view of an example cooling module of the cooling system of the example harvester of FIG. 6A; the example cooling module being formed from the skeleton frame of FIG. 7A, the skin of FIG. 8 and example cooling cores.
Figure 11:
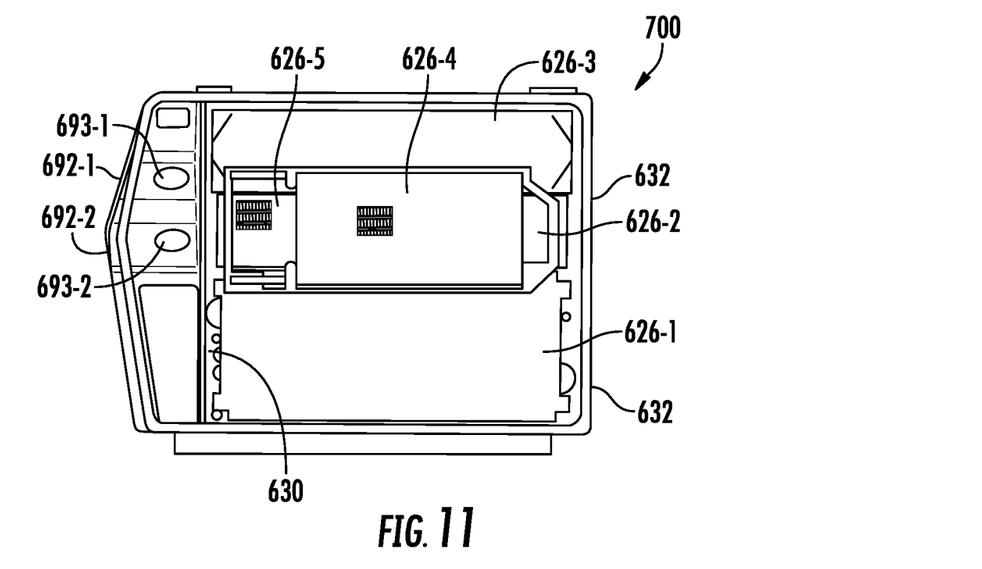
FIG. 11 is a front view of the example cooling module of the cooling system of the example harvester of FIG. 6A further illustrating additional cooling cores.

FIGS. 10 and 11 illustrate the example cooling module 700 formed by the addition of cooling cores 626 two the assembled skeleton frame 630 and skin 632. As shown by FIG. 10, cooling core 626-1, 626-2 and 626-3 are initially mounted to skeleton frame 630. In the example illustrated, cooling core 626-1 comprises a radiator heat exchanger, directing radiator fluid through fluid passages 702 between thermally conductive fins 704 (shown in the enlarged blowup portion of cooling core 626-1). Cooling core 626-2 is similar to cooling core 626-1 except that cooling core 626-2 comprises an oil cooler or heat exchanger, directing oil through fluid passages 702 between fins 704. Cooling core 626-3 is similar to cooling core 626-1 except that cooling core 626-3 directs charge air cooler (CAC) fluid through fluid passages 702 between fins 704.

As shown by FIG. 11, cooling core 626-4 and 626-5 comprise cooling cores or heat exchangers mounted in front of cores 626-1, 626-2 and 626-3. In the example illustrated, cooling core 626-4 comprise a condenser heat exchanger for air-conditioning, such as air-conditioning of the cab 535. Cooling core 626-5 comprise a fuel cooler heat exchanger directing fuel through fluid passages 702 between fins 704.

Figure 13:
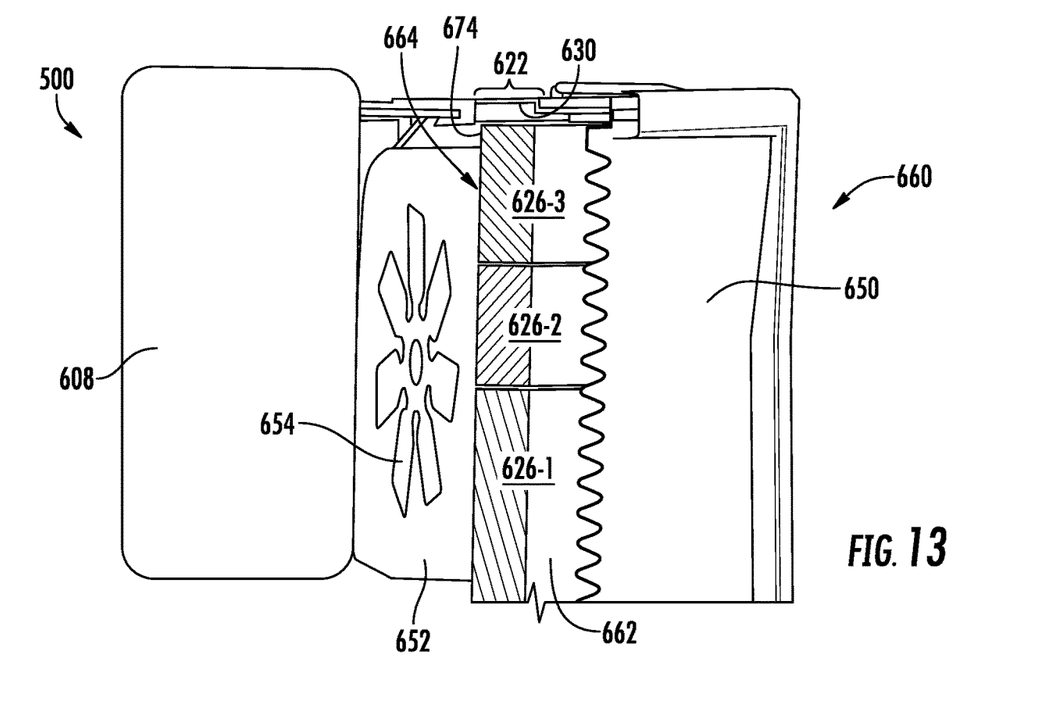
FIG. 13 is an enlarged fragmentary sectional view of a portion of the harvester of FIG. 6A.

As shown by FIGS. 12 and 13, screen 650 extends across a front face 660 of package 624, spanning over central opening 634 of skeleton frame 630. Screen 650 inhibits the entry of airborne debris through opening 634 and onto the front face 662 of cooling cores 626. In the example illustrated, screen 650 is mounted to package 624.

Fan enclosure or shroud 652 extends across a rear face 664 of package 624. In one implementation, fan shroud 652 is mounted to package 624. Fan shroud 652 has an opening 666 (shown in FIG. 6C) in substantial alignment with central opening 634 of skeleton frame 630 and of package 624. Fan shroud 652 supports fan 654 opposite to central opening 634 and opposite to a rear face of the cooling cores 626.

Fan 654 comprise a blower supported by fan shroud 652. As shown by FIG. 13, fan 654 draws air through screen 650, through cooling cores 626 and at engine 608. As discussed above, the ambient air drawn by fan 654, such as from locations external to harvester 500, is at a temperature lower than that of the fluid entering the cooling core. The cooler air drawn through cooling cores 626 absorbs or extracts heat from the fluid flowing through conduits or tubing of cooling core 626, allowing the now cooler fluid to return to the component being cooled.

The differences in air pressure created by fan 654 within cooling system 610 may tend to draw airborne debris or particles into package 624, wherein the debris or particles may deposit upon the front face 662 of cooling core 626, blocking our impeding the flow of air through cooling core 626 and reducing the performance of cooling system 610. In addition to facilitating the use of an open frame to skeleton frame 630 to reduce the weight of package 624 and cooling system 610 and in addition to reducing manufacturing and assembly complexity and cost, skin 632 provides an enhanced seal for the interior of package 624, reducing the entry of airborne debris. As a result, skin 632 may enhance the performance of cooling system 610.

Although harvester 500 is illustrated as comprising cooling core support package 624, in other implementations, harvester 500 may comprise other similar cooling core support packages. For example, in other implementations, harvester 500 may comprise cooling core support package 24 or 124 described above. It should be appreciated that harvester 500 may likewise comprise any of the above described cooling core support packages or similar cooling core support packages.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A cooling system comprising:
   at least one cooling core;
   a skeleton frame having a central opening receiving and framing the at least one cooling core;
   a skin wrapping over and about the skeleton frame;
   a screen in front of the at least one cooling core;
   a fan shroud mounted to the skin and the skeleton frame; and
   a fan partially enclosed by the fan shroud.

2. The cooling system of claim 1, wherein the skeleton frame comprises at least one metal and wherein the skin is formed from at least one material selected from a group of materials consisting of: (A) a composite material; (B) a polymer and (C) a metal panel having a wall thickness of no greater than 2 mm.

3. The cooling system of claim 2, wherein the central opening surrounded by the skeleton frame has an area of at least 0.5 m$^2$.

4. The cooling system of claim 1, wherein the skin forms a wall along the perimeter of the skeleton frame, the wall having a duct opening to receive an airflow duct.

5. The cooling system of claim 3, wherein the duct opening is angled to support the airflow duct at an upwardly inclined orientation.

6. The cooling system of claim 4, where the wall forms a second duct opening to receive a second airflow duct.

7. The cooling system of claim 6, wherein the second duct opening is angled to support the second airflow duct at an upwardly inclined orientation.

8. The cooling system of claim 1, wherein the skeleton frame comprises openings and wherein the skin extends across and over each of the openings.

9. The cooling system claim 1, wherein the skeleton frame, the skin and the at least one cooling core form a cooling module.

10. A working vehicle for an air-born debris environment, the working vehicle comprising:
    a chassis;
    ground motive members coupled to the chassis;
    a power unit supported by the chassis;
    a cooling system supported by the chassis, the cooling system comprising:
       at least one cooling core having a face and outer perimeter edges;
       a skeleton frame having a central opening receiving and framing the at least one cooling core, the skeleton frame extending along the outer perimeter edges, the skeleton frame having an interior about the central opening;
       at least one fluid conduit extending within the interior of the skeleton frame and connected to the at least one cooling core; and
       a skin wrapping over, about and in contact with the skeleton frame to seal the interior of the skeleton frame.

11. The working vehicle of claim 10, wherein the skeleton frame comprises at least one metal and wherein the non-metal skin is formed from at least one material selected from a group of materials consisting of: (A) a composite material; and (B) a polymer.

12. The working vehicle of claim 10, wherein the power unit comprises an internal combustion engine, the working vehicle further comprising:
    a pre-cleaner duct to supply air to the internal combustion engine, wherein the skin forms a wall along the perimeter of the skeleton frame, the wall having a duct opening to receive the pre-cleaner duct.

13. The working vehicle of claim 12, wherein the duct opening is angled to support the pre-cleaner duct at an upwardly inclined orientation.

14. The working vehicle of claim 13, wherein the duct opening is angled to support an intake opening of the pre-cleaner duct in an upper half of the skeleton frame.

15. The working vehicle of claim 10 further comprising:
a screen in front of the at least one cooling core;
a fan shroud mounted to the skin and the skeleton frame; and
a fan partially enclosed by the fan shroud.

16. The working vehicle of claim 10, wherein the skeleton frame comprises openings and wherein the non-metal skin extends across and over each of the openings.

17. The working vehicle of claim 10, wherein the at least one cooling core comprises a radiator heat exchanger, an oil cooler heat exchanger and a charge air cooler heat exchanger.

18. The working vehicle of claim 17, wherein the at least one cooling core further comprises an air conditioning condenser heat exchanger and a fuel cooler heat exchanger.

19. A cooling system comprising:
at least one cooling core;
a skeleton frame having a central opening receiving and framing the at least one cooling core; and
a skin wrapping over, about and in contact with the skeleton frame.

20. The cooling system of claim 19, wherein the skeleton frame comprises a frame wall having a first opening and a second opening therethrough, wherein the skin extends across and over the first opening and wherein the skin comprises a projection projecting into the second opening.

* * * * *